United States Patent [19]

Weber

[11] Patent Number: 4,619,115
[45] Date of Patent: Oct. 28, 1986

[54] BACK PRESSURE REGULATING VALVE
[75] Inventor: Kent Weber, Rockford, Ill.
[73] Assignee: Sundstrand Corporation, Rockford, Ill.
[21] Appl. No.: 739,212
[22] Filed: May 30, 1985
[51] Int. Cl.[4] .............................................. F25B 41/04
[52] U.S. Cl. ...................................... 62/217; 137/489
[58] Field of Search ................... 137/489, 492, 492.5; 251/335.3; 62/217

[56] References Cited
U.S. PATENT DOCUMENTS
3,583,432  6/1971  Powell ................................ 137/489
4,312,375  1/1982  Leinemann ......................... 137/489

FOREIGN PATENT DOCUMENTS
1142257  7/1963  Fed. Rep. of Germany ... 251/335.3
3016080 11/1980  Fed. Rep. of Germany ... 251/335.3

Primary Examiner—Alan Cohan
Attorney, Agent, or Firm—Wood, Dalton, Phillips, Mason & Rowe

[57] ABSTRACT

Back pressure regulation in a system including an evaporator is achieved by a valve having an inlet adapted to be connected to an evaporator, an outlet and an interposed poppet and valve seat. A fluid motor is operative to move the poppet and the fluid motor is controlled by a control fluid inlet, a control fluid outlet and a pressure response valve in fluid communication with the inlet.

10 Claims, 2 Drawing Figures

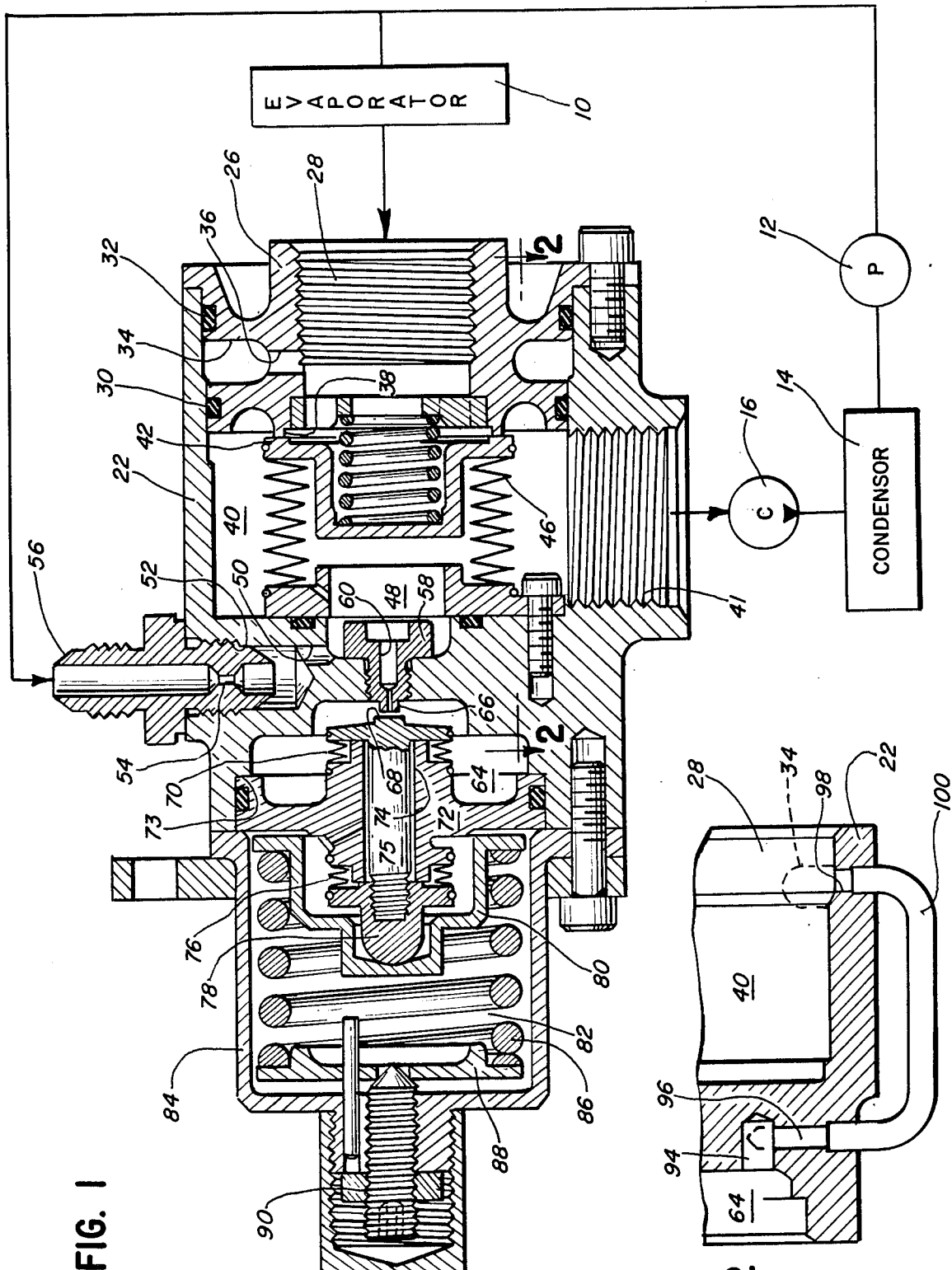

BACK PRESSURE REGULATING VALVE

FIELD OF THE INVENTION

This invention relates to a pressure regulating valve, and more specifically, to a back pressure regulating valve for regulating the pressure upsteam of the valve.

BACKGROUND OF THE INVENTION

Prior art of possible relevance includes the following U.S. Pat. Nos. 1,389,370 issued Aug. 30, 1921 to Metzger; 2,637,946 issued May 12, 1953 to Parks; 2,645,884 issued July 21, 1953 to Kellie; 2,885,173 issued May 5, 1959 to Dobrick; 3,254,662 issued June 7, 1966 to Wagner; 2,946,186 issued July 26, 1960 to Southam; 3,425,434 issued Feb. 4, 1969 to Strickland et al; 3,478,775 issued Nov. 18, 1969 to Friedell; 3,762,436 issued Oct. 2, 1973 to Clayton; and 4,398,393 issued Aug. 16, 1983 to Ipsen.

Pressure regulating valves of various sorts have long been known as indicated by the above identified patents. They are customarily employed in reducing the pressure of fluid from a source to a lower regulated pressure to be utilized by some apparatus at a point of use. In other words, such valves provide a controlled pressure downstream of the pressure regulating valve itself.

In some instances, it is desirable to control the pressure upstream of the pressure regulating valve. An example is a heat exchange system employing an evaporator wherein the temperature at the evaporator must be closely controlled. In the usual case, the temperature of the evaporator will be determined by the temperature at which a liquid phase fluid evaporates to become a saturated vapor; and that in turn will vary dependent upon the pressure of the vapor side of the system.

Consequently, by closely controlling the pressure on the vapor side of an evaporator, the evaporator temperature can be closely controlled.

This, in turn, requires that the pressure of the vapor side of the evaporator be controlled from a point downstream of the evaporator. To some extent, this could be accomplished by bleeding off excess pressure. However, this is not a satisfactory solution in those instances where the pressure at the vapor side of the evaporator can fall to a level less than the set point at which the system bleeds off excess pressure nor is it satisfactory in many instances where closed systems are required.

The present invention is directed to overcoming one or more of the above problems.

SUMMARY OF THE INVENTION

It is a princpal object of the invention to provide a new and improved pressure regulating valve. More specifically, it is an object of the invention to provide a back pressure regulating valve, that is, one that regulates the pressure upstream of the valve.

An exemplary embodiment of the invention achieves the foregoing objects in a construction including a valve body having a regulating chamber and a control chamber. The regulating chamber includes an inlet for connection to, as for example, the vapor side of an evaporator, a valve seat about the inlet, an outlet spaced from the valve seat and a poppet movable toward and away from the valve seat. A fluid motor is provided for moving the poppet relative to the seat and a control fluid inlet is disposed in the body and connected to the motor. A control fluid outlet is also provided and extends from the motor to the control chamber. Pressure responsive means are located in the control chamber for controlling the flow of control fluid through the control fluid outlet and a fluid passage interconnects the inlet and the control chamber to be in fluid communication with the pressure responsive means.

The arrangement is such that for a lower than desired vapor pressure at the inlet, the pressure in the control chamber will lessen with the result that the pressure responsive means will lessen the flow of control fluid through the control fluid outlet from the motor. As a consequence, control fluid entering the control fluid inlet will operate the motor to move the poppet toward the valve seat to further restrict the flow path from the valve inlet to the valve outlet thereby increasing the back pressure in the system until the desired back pressure at the inlet is achieved.

Where the inlet pressure is greater than that desired, it will be communicated via the fluid passage to the control chamber and cause the pressure responsive means to increase the flow of control fluid to the control fluid outlet to a rate exceeding that in which control fluid is introduced into the control fluid inlet. As a result, the fluid motor will allow the poppet to move away from the valve seat decreasing the resistance to fluid flow to allow pressure at the valve inlet to be reduced until the equilibrium level is achieved.

Thus, the pressure at the vapor outlet of, for example, an evaporator can be regulated to a fine degree to control the pressure within the evaporator and thus the temperature thereof.

In a preferred embodiment of the invention, the fluid motor comprises an expandible bellows in the regulating chamber and the bellows mounts the poppet in proximity to the valve seat.

The invention also contemplates that the control fluid outlet include a second valve seat and that the pressure responsive means comprise an expandible bellows in the control chamber aligned with the seat and carrying a valve member in proximity thereto.

When used in an evaporator system, the control fluid inlet is adapted to receive the fluid whose pressure is being regulated in the liquid phase and includes a flow metering orifice.

In addition to the bellows within the control chamber, the invention further contemplates a further bellows joined to the bellows in the control chamber and together therewith defining a sealed interior space. The junction of both bellows defines a rigid boundary of the control chamber with the further bellows being exterior of the control chamber. A rigid rod extends through the interior space and interconnects opposite ends of such bellows.

Thus, should the bellows in the control chamber develop a leak, the additional bellows exterior thereof serves to be pressure responsive in the same fashion to provide failure protection for the system.

Other objects and advantages will become apparent from the following specification taken in connection with the accompanying drawings.

DESCRIPTION OF THE DRAWINGS

FIG. 1 is a sectional view of a valve made according to the invention and illustrates, in schematic form, a typical environment of use; and FIG. 2 is a view taken approximately along the line 2—2 in FIG. 1 with certain components omitted for clarity.

DESCRIPTION OF THE PREFERRED EMBODIMENT

An exemplary embodiment of a pressure regulating valve made according to the invention is illustrated in FIG. 1 in the environment of a heat exchange system including an evaporator 10 wherein a refrigerant as, for example, ammonia is to be evaporated under close temperature control. The evaporator 10 receives liquid refrigerant from a pump 12 via a conventional metering orifice 13 normally within the evaporator 10 itself after the refrigerant is condensed in a condenser 14. In some, but not all, systems with which the invention may be used, the refrigerant in vapor form is compressed by a compressor 16 prior to its admittance to the condenser 14.

In order to control the pressure within the evaporator 10 on the vapor side thereof, the back pressure regulating valve of the invention is employed and the same is seen to include a valve body 22 having an open end 24 which is closed by a cast and machined closure 26 having the configuration illustrated in FIG. 1. Centrally of the closure 26 is a vapor inlet 28 which is adapted to be connected to the vapor outlet from the evaporator 10 when used in a system such as illustrated.

O-ring seals 30 and 32 flank a radially outwardly opening annulus 34 in the closure 26 which is in fluid communication with the inlet 28 via a radial bore 36 for purposes to be seen.

Formed about the inlet 28 on the interior end of the closure 26 is a valve seat 38 which faces and opens to a regulating chamber 40 defined by the housing 22 and the closure 26. An outlet 41 opens from the chamber 40 to the exterior of the housing 22 and is adapted to be connected to, for example, the compressor 16. A poppet 42 is disposed within the chamber 40 in alignment with the seat 38. A return spring 44 on a bridge 45 spanning the inlet 28 biases the poppet 42 toward an open position. The poppet 42 itself is mounted on one end of an expandible metal bellows 46 located within the chamber 40.

The arrangement is such that when the bellows 46 expands, the poppet 42 will be moved towards the seat 38.

Expansion of the bellows 46 is accomplished by the admission of a control fluid to a chamber 48 defined by the interior of the bellows 46 via a bore 50 extending to a tapped bore 52 in the housing 22. Within the tapped bore is a flow metering orifice shown schematically at 54 and a fitting 56 which may be connected to the output of the pump 12. In one embodiment of the invention, the pressure of the fluid at the inlet of the chamber 48 is 12-15 psi above the vapor pressure at the inlet 28 as a result of throttling occurring at the orifice 13. The just described components define a control fluid inlet to the bellows 46 whereby the same may act as a fluid motor to drive the poppet 42 toward the seat 38.

The chamber 48 defined by the interior of the bellows 46 includes a control fluid outlet defined by a fitting 58 having an interior bore 60 and threaded into a web 62 forming part of the housing 22. The bore 60 extends to a control chamber 64 within the housing 22 on the side of the web 62 opposite the regulating chamber 40 and terminates therein in a valve seat 66.

Aligned with the valve seat 66 within the control chamber 64 is a poppet 68 mounted on an expandible metal bellows 70 which in turn is mounted on a web-like fitting 72 received within and sealed to a recess 73 at the end of the housing 22 opposite the chamber 40.

The fitting 72 includes a central bore 74 through which extends a rigid rod 75 connected to the poppet 70. On the side of the fitting 72 opposite the bellows 70 there is located an expandible metal bellows 76 to which the rigid rod 75 is secured. The bellows 70 and 76 have identical pressure responsive areas for purposes to be seen.

Mounted on the end of the rod 75 is a semi-spherical formation 78 which is received in a spring retainer 80 disposed in a spring chamber 82 of a housing cap 84 secured to the housing 22 by any suitable means. A compression coil spring 86 is disposed within the chamber 82 between a spring retainer 88 and the spring retainer 80. An adjustment screw 90 is threaded into the housing cap 84 and bears against the retainer 88 whereby the degree of compression of the spring 86 can be altered as desired.

In any event, it will be appreciated that the compression spring 86 applies a biasing force directed rightwardly as viewed in FIG. 1 which is ultimately applied to the poppet 68 to bias the same toward the seat 66.

It should be noted that the bore 74 is sized to be of a somewhat larger diameter than the rod 75 so as to both establish fluid communication between the interiors of the bellows 70 and 76 and to avoid sliding contact between the rod 75 and the fitting 72 during operation of the valve.

As seen in FIG. 2, an axial bore 94 extends from the control chamber 64 into the web 62 to intersect a bore 96 extending to the exterior of the body 22. In addition, a bore 98 is disposed in the housing 22 in alignment with the annulus 34 and a U-shaped piece of tubing 100 interconnects the bores 96 and 98. Thus, the control chamber 64 is placed in fluid communication with the inlet 28 upstream of the valve seat 38 by means of the bore 36, the annulus 34, the bore 98, the tube 100, the bore 96, and the bore 94. Because the fluid being regulated may exist in the liquid phase or the vapor phase or a mixture of both and it is desirable to maintain continual communication between the inlet 28 and the control chamber 64 without regard to forces relating to meniscus or viscosity of the liquid, it is preferably that the fluid path just described be of sufficiently large diameter than a plug of the fluid in the liquid phase cannot exist thereacross.

When the system is not in operation, the bellows 46, due to its inherent resiliency and the action of the return spring 44 will drive the poppet 42 from the seat 38 so that, upon start-up, vapor may flow from the inlet 28 to the outlet 41 upon initiation of operation of the system.

When system operation is initiated, the pump will drive refrigerant in the liquid phase to the control fluid inlet whereat the same will be metered by the orifice into the interior chamber 48 of the bellows 46. At the time of start-up, there will be no vapor pressure at the inlet 28 that could be applied against the bellows 70 with the consequence that the biasing force provided by the spring 86 will seat the poppet 68 against the seat 66 thereby closing the control fluid outlet from the chamber 48. As a consequence, the bellows 46 will begin to expand and the poppet 42 will begin to close. Continued system operation plus the increased resistance to vapor flow provided by the closing movement of the poppet 42 will result in pressure at the inlet 28 becoming elevated. At some point in time, the pressure of the vapor at the inlet 28 as applied to the bellows 70 in the control chamber 64 along with such pressure as may be applied directly against the poppet 68 by the pressure of the control fluid will overcome the bias provided by the spring 86 and cause the poppet 68 to move away from the seat 66. This in turn will allow the control fluid to begin to exit the interior chamber 48 of the bellows 46. If the exit rate is greater than the entrance rate, the inherent resiliency of the bellows 46 as well as the pressure applied against the poppet 42 by the vapor at the inlet 28 and by the return spring 44 will cause the poppet 42 to open to a greater degree thereby increasing the vapor flow from the inlet 28 to the outlet 41 and lowering the pressure at the inlet 28. The lowering of pressure will in turn be communicated to the control chamber 64 and with less pressure acting on the bellows 70 to open the poppet 68, the latter will close somewhat until the rate of liquid flow into the interior of the bellows 46 is equal to the rate of outflow therefrom and the system will balance to maintain a desired pressure at the inlet 28. Those skilled in the art, will recognize that the pressure at which balancing is achieved is set by appropriate adjustment of the compression of the spring 28 using the adjusting screw 90.

In the case where even after the poppet 68 has opened somewhat and the rate of inflow of fluid to the chamber 48 remains greater than the rate of outflow, the bellows 46 will continue to expand tending to further close the poppet 42. This in turn will result in a reduced flow rate from the inlet 28 to the outlet 41 increasing the pressure at the inlet 28. The increase in pressure will, of course, be communicated to the control chamber 64 and the resulting increase in pressure against the bellows 70 will cause the poppet 68 to move to a more open position thereby increasing the rate of outflow of control fluid from the interior of the bellows 46; and again balancing will be achieved.

This mode of operation of the system is dependent upon the integrity of the bellows 70. As is well known, occasionally such devices develop small cracks and that in turn would allow the control fluid to enter the interior of the bellows 70 to act oppositely against the pressure applied on the exterior of the bellows 70 which tends to open the poppet 68. Without more, the system would be rendered inoperative. However, because the present invention utilizes the second bellows 76 which is equal in size to the bellows 70, it can be seen that the system will continue to operate as intended. Specifically, such fluid as may enter the interior of the bellows 70 as a result of a crack or the like will flow to the interior of the bellows 76. Because the latter is of the same pressure effective size as the former, even though pressure forces acting on opposite sides of the bellows 70 are equal, there will remain a pressure force acting on the interior of the bellows 76 which is conveyed by the rod 75 to open the poppet 68 and the system will continue to function.

Of particular consequence according to the invention is the fact that no sliding parts are employed. Thus, friction or other losses associated with sliding contact in the valves do not play a part in the operation of the back pressure regulating valve of the invention allowing extremely fine control of pressure at the inlet 28. The only moving parts of the system, namely, three bellows 46,70,76 and two poppets 42,68 as well as the rod 75 are all free of frictional engagement with other components, essentially floating in their respective chambers or bores.

From the foregoing, it will be appreciated that a back pressure regulating valve made according to the invention is ideally suited for use in a closed system and operates to regulate pressure upstream of the valve for both overpressure and underpressure situations. The valve is simple in construction and can accommodate failures in internal working parts.

I claim:

1. An evaporator system including:
  an evaporator;
  a condenser upstream of the evaporator;
  a compressor connected to said condenser; and
  a back pressure regulating valve downstream of the evaporator to regulate the pressure in the evaporator, said valve comprising:
  a housing having an inlet connected to an evaporator and an outlet connected to said compressor;
  a valve seat within said housing and functionally interposed between said inlet and said outlet;
  a poppet within said housing and mounted for movement therein toward and away from said seat by a bellows, said bellows defining an expandable chamber, which when expanding, moves said poppet toward said seat;
  a control fluid inlet to said chamber and connected to said evaporator on the upstream side thereof;
  a control fluid outlet for said chamber;
  a pressure responsive valve for controlling control fluid flow from said fluid outlet;
  means including a fluid connection to said inlet, for applying an opening force to said pressure responsive valve; and
  means for applying a closing force to said pressure responsive valve.

2. The system of claim 1 wherein said pressure responsive valve includes a pressure responsive surface facing said control fluid outlet.

3. The system of claim 2 wherein said opening force applying means includes an additional bellows mounting said pressure responsive valve for movement toward and away from said control fluid outlet, said bellows having a further pressure responsive surface in fluid communication with said fluid connection.

4. The system of claim 3 wherein said control fluid inlet is adapted to receive a control fluid in the liquid phase and further including a flow regulating orifice in said control fluid inlet.

5. The system of claim 4 wherein said closing force applying means comprises a compression spring, and means for adjusting the compression of said spring.

6. A back pressure regulating valve adapted for connection in an evaporator system downstream of the evaporator to regulate the pressure in the evaporator, said valve comprising:
  a housing having an inlet adapted to be connected to an evaporator and an outlet;
  a valve seat within said housing and functionally interposed between said inlet and said outlet;
  a poppet within said housing and mounted for movement therein toward and away from said seat by a bellows, said bellows defining an expandible chamber, which when expanding, moves said poppet toward said seat;
  a control fluid inlet to said chamber adapted to receive a control fluid in the liquid phase and further including a flow regulating orifice in said control fluid inlet;

a control fluid outlet for said chamber;

a pressure responsive valve for controlling control fluid flow from said fluid outlet and including a pressure responsive surface facing said control fluid outlet;

means including a fluid connection to said inlet, for applying an opening force to said pressure responsive valve including an additional bellows mounting said pressure responsive valve for movement toward and away from said control fluid outlet, said bellows having a further pressure responsive surface in fluid communication with said fluid connection; and said additional bellows being housed in a bellows chamber in said housing and additionally including a further bellows joined to said additional bellows and together therewith defining a sealed interior space, the junction of said additional and further bellows defining a rigid boundary of said bellows chamber with said further bellows being exterior of said bellows chamber, and a rigid rod extending through said interior space and interconnecting opposite ends of said further and additional bellows.

7. A back pressure regulating system including an evaporator and a back pressure regulating valve connected to the evaporator on the downstream side thereof and including:

a valve body including a regulating chamber and a control chamber;

said regulating chamber including an inlet connected to said evaporator, a valve seat about the inlet, and outlet spaced from the valve seat and a poppet movable toward and away from said valve seat;

a fluid motor for moving said poppet relative to said seat;

a control fluid inlet in said body and interconnecting said motor and the upstream side of said evaporator;

a control fluid outlet from said motor extending to said control chamber;

pressure responsive means in said control chamber for controlling the flow of control fluid through said control fluid outlet; and a fluid passage interconnecting said inlet and said control chamber to be in fluid communication with said pressure responsive means.

8. The back pressure regulating system of claim 7 wherein said fluid motor comprises an expandible bellows in said regulating chamber, said bellows mounting said poppet in proximity to said seat.

9. The back pressure regulating system of claim 7 wherein said control fluid outlet includes a second valve seat and said pressure responsive means comprises an expandible bellows in said control chamber aligned with said seat and carrying a valve member in proximity thereto.

10. The back pressure regulating system of claim 7 wherein said control fluid inlet is adopted to receive a fluid in the liquid phase and includes a flow metering orifice.

* * * * *